Aug. 12, 1969 W. P. TAYLOR ET AL 3,460,564
ANTI-ICER VALVE
Filed Sept. 15, 1967

INVENTORS
WILLIAM P. TAYLOR
DAVID V. DRAZKOWSKI

BY Oberlin, Maky, Donnelly & Renner
ATTORNEYS

3,460,564
ANTI-ICER VALVE

William P. Taylor, Los Angeles, and David V. Drazkowski, Torrance, Calif., assignors to Parker-Hannifin Corporation, Cleveland, Ohio, a corporation of Ohio
Filed Sept. 15, 1967, Ser. No. 668,228
Int. Cl. F16k *31/06, 31/143*
U.S. Cl. 137—517                                      15 Claims

ABSTRACT OF THE DISCLOSURE

Anti-icer valve for use as with aircraft engines and/or aircraft surfaces for anti-icing purposes characterized in that the flow of heated air through the valve is controlled by inlet pressure.

---

The present invention relates generally as indicated to an anti-icer valve and more particularly to such valve adapted for use to conduct fluid such as hot air, to aircraft airfoils, control surfaces, engine cowls, etc. to eliminate icing problems.

In such anti-icing installations, the flow of heated air through the control valve is generally controlled by one of the following methods: (1) varying the area of the air flow passage through the valve responsive to the inlet air temperature, or (2) varying the area of the air flow passage through the valve so as to maintain a constant pressure at the outlet of the valve.

Some installations use a valve with an unvarying area of the air flow passage when open, such valve, of course, being inefficient insofar as accurate control of air flow is concerned.

It is a principal object of this invention to provide an anti-icing valve of the character indicated which is operative substantially in the desired manner aforesaid but which responds to change in inlet pressure of the hot air.

It is another object of this invention to provide a simplified form of anti-icing valve which makes unnecessary the provision of thermostatic control devices or downstream control devices in combination with the valve actuating mechanism.

Other objects and advantages of the present invention will become apparent as the following description proceeds.

Figure 1:
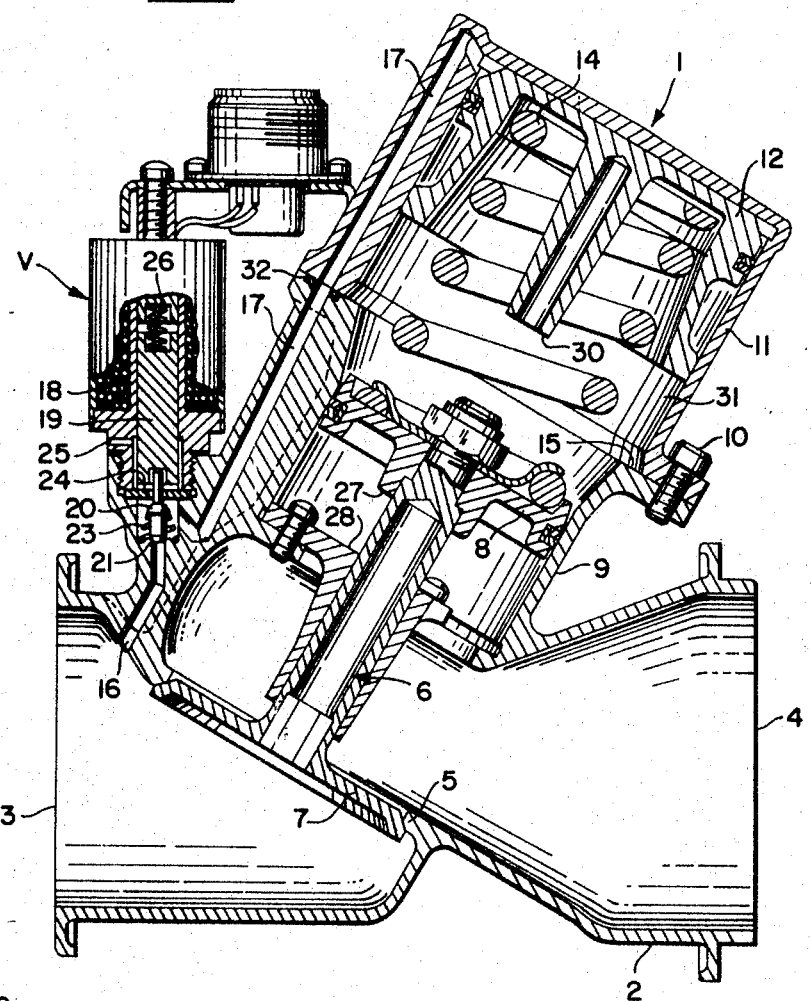
Figure 2:
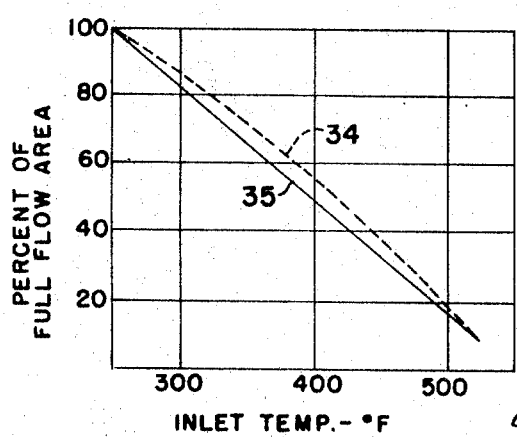

In said annexed drawing:

FIG. 1 is a central vertical cross-section view of an anti-icer valve embodying the present invention; and FIG. 2 is a graph comparing the results of the present valve with one operated by a temperature sensing device.

Referring now in detail to FIG. 1 of the drawing, the anti-icer valve 1 comprises a housing 2 having an inlet port 3 for the entering hot air as from a jet engine compressor, an outlet port 4, and a seat 5 between the inlet and outlet ports 3 and 4. The valve member 6 comprises a valve disk 7 at one end cooperating with the seat 5 and a piston 8 at the other end reciprocable in a cylinder 9 formed as a part of the valve housing. The seat 5 and piston 8 diameters are substantially equal so that the valve member 6 is substantially balanced with reference to pressure in the outlet port 4. Accordingly pressure in the inlet port 3 acts on the disk 7 on the area of seat 5 tending to urge the valve member 6 to seated position.

Secured on housing 2 as by screws 10 is a cap member 11 which constitutes a cylinder for a loading piston 12 which bears on the valve member 6 through a spring 14 between said pistons 8 and 12. The loading piston 12 is of larger diameter than the valve piston 8 and the valve disk 7 so that when equal pressures are applied on the loading piston 12 and on the valve disk 7, the larger loading piston 12 will be urged toward the stop shoulder 15, and the valve member 6 will be moved away from the seat 5 through the force exerted by the spring 14.

Inlet pressure is conducted into the cylinder 11 to act on the loading piston 12 through a three-way solenoid operated valve V which opens communication between the inlet port 3 and the upper end of the cylinder 11 via the passages 16 and 17 when the solenoid 18 is energized. As shown, when the solenoid 18 is energized, the armature 19 thereof will be pulled upwardly whereby the valve member 20 will be moved upwardly away from its seat 21 by pressure in the inlet port 3 and by the biasing spring 23. When the solenoid 18 is thus energized, not only does the valve member 20 move away from its seat 21 by the spring 23, but, in addition, said valve member 20 engages the seat 24 so that the inlet pressure is conducted to the cylinder without escape of air to the atmosphere through the exhaust passage 25.

On the other hand, when the solenoid 18 is de-energized, the spring 26 biases the armature 19 downwardly to cause the valve member 20 to engage its seat 21, whereby the cylinder 11 is vented to the atmosphere via the passage 17, the open seat 24, and the exhaust passage 25.

The valve 1 herein has two modes of operation, i.e. with solenoid 18 energized the valve is in its "operating" mode and with solenoid 18 de-energized the valve is in its "shut-off" mode. Because there is a relationship between the outlet pressure and temperature of a jet engine compressor, the present invention utilizes such compressor outlet pressure (valve inlet pressure) to vary the flow control area of the valve 1.

By way of specific example, when the solenoid 18 of solenoid valve V is energized and when the inlet pressure in port 3 is less than 23 p.s.i., the valve member 6 will be moved to its fully open position (with the stops 27 and 28 engaged with each other) by the dominant force of loading piston 12 and spring 14, but at such pressure, the spring 14 will not have been compressed to an extent sufficient to permit the loading piston 12 to engage the stop shoulder 15. At inlet pressures above 23 p.s.i., the loading piston 12 will be moved down to its stop position against the stop shoulder 15 to retain the valve member 6 in its fully open position.

As the inlet pressure increases, the valve member 6 will remain in fully open position up to a pressure of 36.1 p.s.i., and at pressures between 36.1 and 110.3 p.s.i. the valve member 6 will move toward the seat 5 to decrease the flow area into the outlet port 4. At an inlet pressure of 110.3 p.s.i., the valve member 6 contacts the stop 30 of the loading piston 12 to provide a small annular opening between the valve member 6 and its seat 5 so as to constitute, in effect, a fixed annular orifice for continued restricted flow from the inlet 3 to the outlet 4 at pressures above 110.3 p.s.i.

When the solenoid 18 of solenoid valve V is de-energized, the armature 19 thereof is moved downwardly through spring 26 to move the valve member 20 out of engagement with the seat 24 and into engagement with the seat 21 thus to vent the loading cylinder 11 to the atmosphere through the exhaust passage 25 in said solenoid valve V. By thus decreasing the pressure acting on the loading piston 12, the pressure in the inlet port 3 acting on disk 7 of the valve member 6 will urge it against its seat 5, thus closing the valve 1.

Adjustment of performance characteristics of the valve 1 can be achieved in a simple manner. The open area and restricted area of the valve 1 are determined by internal stops 27–28, 15, and 30 which can be varied as by washers or spacers or other adjusting means (not shown). The pressure range at which the flow area varies is determined by the spring 14 load at the stops 27–28 and 15, whereby the substitution of a different spring 14 can change this range.

Preferably, the chamber 31 between the valve piston 8 and the loading piston 12 is vented to the atmosphere simply by bolting the cap 11 to the housing 2 without an intervening gasket except for the gasket 32 which seals the joint where the passages 17 meet. If desired or necessary, the housing 2 or cap 11 may be provided with radial grooves or scratches or other means to prevent pressure buildup in the chamber 31.

Performance of an example of this valve 1 is shown on the curve 34 in FIG. 2 and this may be compared with the curve 35 which represents the performance of a valve in which the flow area is varied according to inlet air temperature. It can be seen from a comparison of the curves 34 and 35 that the present valve 1 (curve 34) while being responsive to inlet pressure, does provide for a control of outlet flow area which is generally the same as that obtained by the use of air temperature controls (curve 35).

In a valve for anti-icer system use it would, of course, be possible to vary the flow control area based on inlet air temperature or to control the outlet pressure to a constant value. However, in this case the anti-icer valve controls the flow control area based on inlet pressure. In other words, in the present case the main valve member 6 is wide open when inlet pressure is low and is nearly closed when the inlet pressure is high. At intermediate pressures, the flow area is inversely proportional to inlet pressure in a manner to simulate the control required for anti-icing, and otherwise achieved by thermostatic control devices.

We therefore particularly point out and distinctly claim as our invention:

1. A valve assembly comprising a housing having a passage therethrough; a valve member movable in said housing toward passage closing position under the influence of upstream fluid pressure in said passage; spring means baising said valve member toward passage opening position but permitting movement of said valve member toward passage closing position as the upstream fluid pressure increases; and fluid pressure actuated means in said housing acting on said spring means to urge said valve member toward passage opening position.

2. The valve assembly of claim 1 wherein said fluid pressure actuated means is actuated by upstream fluid pressure acting on an area thereof which is greater than the area of said valve member acted upon by such upstream fluid pressure.

3. The valve assembly of claim 1 wherein said fluid pressure actuated means is actuated by upstream fluid pressure acting on an area thereof which is greater than the area of said valve member acted upon by such upstream fluid pressure; and wherein vent means are provided in said housing to decrease the fluid pressure acting on said fluid pressure actuated means to a value such that the upstream fluid pressure moves said valve member to passage closing position.

4. A valve assembly comprising a housing having a passage therethrough; a valve member movable in said housing toward passage closing position under the influence of upstream fluid pressure in said passage; a valve actuating member movable in said housing under the influence of upstream fluid pressure in said passage in a direction opposite to the passage closing movement of said valve member; spring means between said members to move said valve member toward passage opening position upon movement of said actuating member under the influence of such upstream fluid pressure, and to permit yieldable movement of said valve member toward passage closing position under the influence of increasing upstream fluid pressure.

5. The valve assembly of claim 4 wherein vent means are provided in said housing to decrease the fluid pressure acting on said actuating member relative to the upstream fluid pressure acting on said valve member whereby the latter will be urged to passage closing position.

6. The valve assembly of claim 4 wherein said valve member is substantially balanced insofar as downstream fluid pressure in said passage is concerned whereby movement of said valve member is primarily controlled by upstream fluid pressure.

7. The valve assembly of claim 4 wherein said actuating member is engaged by said valve member before the latter reaches passage closing position to assure fluid flow through said passage regardless of the magnitude of upstream fluid pressure.

8. The valve assembly of claim 4 wherein said actuating member comprises a piston having an area acted upon by upstream fluid pressure which is larger than the area of said valve member which is acted upon by upstream fluid pressure.

9. The valve assembly of claim 4 wherein said valve member has a valve head and a valve piston to provide substantially a fluid pressure balance of downstream fluid pressure whereby movement of said valve member is primarily controlled by upstream fluid pressure.

10. The valve assembly of claim 4 wherein said valve member has a valve head and a valve piston to provide substantially a fluid pressure balance of downstream fluid pressure whereby movement of said valve member is primarily controlled by upstream fluid pressure; and wherein said actuating member comprises a piston spaced from said valve piston and having an area acted upon by upstream fluid pressure which is larger than the area of said valve head which is acted upon by upstream fluid pressure.

11. The valve assembly of claim 4 wherein a three-way valve in said housing having a vent port, an inlet port, and an outlet port is selectively operative to close said vent port and to conduct upstream fluid pressure through said inlet and outlet ports to act on said actuating member or to close said inlet port and to vent such fluid pressure acting on said actuating member through said outlet and vent ports.

12. A valve assembly comprising a housing having a passage therethrough; a valve member movable in said housing toward passage closing position under the influence of upstream fluid pressure in said passage; spring means biasing said valve member toward passage opening position but permitting movement of said valve member toward passage closing position as the upstream fluid pressure increases; and fluid pressure actuated stop means in said housing engaged by said valve member before it reaches passage closing position under the influence of increasing upstream fluid pressure.

13. The valve assembly of claim 12 wherein said stop means is actuated by upstream fluid pressure acting on an area thereof which is greater than the area of said valve member acted upon by such upstream fluid pressure.

14. A valve assembly comprising a housing having a passage therethrough; a valve member movable in said housing toward passage closing position under the influence of upstream fluid pressure in said passage; a valve actuating member movable in said housing to a stop position under the influence of upstream fluid pressure in said passage in a direction opposite to the passage closing movement of said valve member; spring means between said members to move said valve member toward passage opening position upon movement of said actuating member to said stop position under the influence of such upstream fluid pressure, and to permit yieldable movement of said valve member toward passage closing position under the influence of increasing upstream fluid pressure.

15. The valve assembly of claim 14 wherein said actuating member is engaged by said valve member before the latter reaches passage closing position to assure fluid flow through said passage regardless of the magnitude of upstream fluid pressure.

References Cited

UNITED STATES PATENTS 2,163,597  6/1939  Grove _____ 137—489.5

FOREIGN PATENTS 511,758  4/1951  Canada.

M. CARY NELSON, Primary Examiner

ROBERT J. MILLER, Assistant Examiner

U.S. Cl. X.R.

251—30